United States Patent
Xiao et al.

(10) Patent No.: US 11,663,622 B2
(45) Date of Patent: May 30, 2023

(54) OFFLINE INFORMATION PUSHING METHOD AND APPARATUS

(71) Applicant: Advanced New Technologies Co., Ltd., Grand Cayman (KY)

(72) Inventors: Nan Xiao, Hangzhou (CN); Zhenyu Yang, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 75 days.

(21) Appl. No.: 16/702,829

(22) Filed: Dec. 4, 2019

(65) Prior Publication Data

US 2020/0111117 A1    Apr. 9, 2020

Related U.S. Application Data

(63) Continuation of application No. PCT/CN2018/103731, filed on Sep. 3, 2018.

(30) Foreign Application Priority Data

Sep. 7, 2017   (CN) .......................... 201710800649.5

(51) Int. Cl.
*G06Q 30/00*     (2023.01)
*G06Q 30/0235*   (2023.01)
(Continued)

(52) U.S. Cl.
CPC ..... *G06Q 30/0235* (2013.01); *G06Q 20/3276* (2013.01); *G06Q 20/387* (2013.01);
(Continued)

(58) Field of Classification Search
CPC . G06Q 30/0207–0277; G06Q 30/0235; G06Q 20/3276; G06Q 30/0226; G06Q 30/0238
See application file for complete search history.

(56) References Cited

U.S. PATENT DOCUMENTS

| | | | |
|---|---|---|---|
| 8,806,209 B2 | 8/2014 | Hemphill et al. | |
| 2002/0095333 A1* | 7/2002 | Jokinen .................. | G06Q 30/02 705/14.26 |

(Continued)

FOREIGN PATENT DOCUMENTS

| | | |
|---|---|---|
| CN | 101799902 | 8/2010 |
| CN | 103177516 | 6/2013 |

(Continued)

OTHER PUBLICATIONS

A. Garyfalos and K. C. Almeroth, "Coupons: A Multilevel Incentive Scheme for Information Dissemination in Mobile Networks," in IEEE Transactions on Mobile Computing, vol. 7, No. 6, pp. 792-804, Jun. 2008, doi: 10.1109/TMC.2008.37. (Year: 2008).*

(Continued)

*Primary Examiner* — Sun M Li
(74) *Attorney, Agent, or Firm* — Fish & Richardson P.C.

(57) ABSTRACT

Probing data comprising terminal identifier data is received by a broadcast device, the terminal identifier data identifying terminals that are located within a predetermined distance of the broadcast device. The probing data is uploaded by the broadcast device to a server. An information pushing condition is matched by the server based on the terminal identifier data. Information corresponding to an information pushing condition matching the terminal identifier data is pushed by the server to the broadcast device. The received corresponding information is broadcast by the broadcast device.

20 Claims, 9 Drawing Sheets

(51) Int. Cl.
  *G06Q 20/32* (2012.01)
  *G06Q 30/0207* (2023.01)
  *G06Q 30/0251* (2023.01)
  *G06Q 20/38* (2012.01)
  *G06Q 30/0226* (2023.01)
  *G06Q 30/0238* (2023.01)
  *G06Q 20/40* (2012.01)

(52) U.S. Cl.
  CPC ....... *G06Q 20/401* (2013.01); *G06Q 30/0226* (2013.01); *G06Q 30/0238* (2013.01); *G06Q 30/0239* (2013.01); *G06Q 30/0261* (2013.01); *G06Q 30/0267* (2013.01)

(56) References Cited

U.S. PATENT DOCUMENTS

| | | | | |
|---|---|---|---|---|
| 2002/0156677 | A1* | 10/2002 | Peters | G06Q 30/02 705/14.64 |
| 2003/0216958 | A1* | 11/2003 | Register | G06Q 30/0268 705/14.61 |
| 2006/0236373 | A1* | 10/2006 | Graves | G06F 21/35 726/3 |
| 2010/0066677 | A1 | 3/2010 | Garrett et al. | |
| 2011/0029359 | A1* | 2/2011 | Roeding | G06Q 30/0261 705/14.1 |
| 2011/0258121 | A1 | 10/2011 | Kauniskangas et al. | |
| 2013/0191199 | A1* | 7/2013 | Corner | G06Q 30/02 705/14.25 |
| 2013/0210461 | A1* | 8/2013 | Moldavsky | G06Q 30/0267 455/456.3 |
| 2013/0297422 | A1* | 11/2013 | Hunter | G06Q 30/0261 705/14.58 |
| 2014/0201069 | A1 | 7/2014 | Arentz | |
| 2014/0222562 | A1* | 8/2014 | Akgul | G06Q 30/0224 705/14.53 |
| 2014/0276143 | A1 | 9/2014 | Corl | |
| 2014/0342760 | A1* | 11/2014 | Moldavsky | H04W 8/005 455/456.3 |
| 2015/0011268 | A1 | 1/2015 | Charugundla | |
| 2015/0089675 | A1 | 3/2015 | Gulick | |
| 2015/0142654 | A1 | 5/2015 | Zamer et al. | |
| 2015/0228044 | A1 | 8/2015 | Jinno et al. | |
| 2015/0271150 | A1 | 9/2015 | Barnett et al. | |
| 2016/0162876 | A1 | 6/2016 | Grigg | |
| 2016/0342974 | A1* | 11/2016 | Feng | G06Q 20/204 |
| 2017/0004484 | A1 | 1/2017 | Seol et al. | |
| 2017/0193543 | A1* | 7/2017 | Priebatsch | G06Q 30/0238 |
| 2018/0007561 | A1* | 1/2018 | Adachi | H04W 72/12 |
| 2018/0174189 | A1* | 6/2018 | Joseph | H04W 4/21 |
| 2018/0218370 | A1 | 8/2018 | Denton | |
| 2018/0240123 | A1 | 8/2018 | Jin et al. | |
| 2018/0247296 | A1 | 8/2018 | Win et al. | |
| 2018/0330146 | A1 | 11/2018 | Wang et al. | |
| 2018/0336384 | A1 | 11/2018 | Maezawa et al. | |
| 2020/0051046 | A1 | 2/2020 | Wang et al. | |
| 2020/0097946 | A1 | 3/2020 | Bian et al. | |

FOREIGN PATENT DOCUMENTS

| | | |
|---|---|---|
| CN | 103402177 | 11/2013 |
| CN | 104469886 | 3/2015 |
| CN | 104599113 | 5/2015 |
| CN | 104660401 | 5/2015 |
| CN | 104794614 | 7/2015 |
| CN | 105117926 | 12/2015 |
| CN | 105117945 | 12/2015 |
| CN | 204856594 | 12/2015 |
| CN | 106296308 | 1/2017 |
| CN | 106303628 | 1/2017 |
| CN | 106447327 | 2/2017 |
| CN | 106533932 | 3/2017 |
| CN | 106779676 | 5/2017 |
| CN | 106845973 | 6/2017 |
| CN | 106886893 | 6/2017 |
| CN | 106886912 | 6/2017 |
| CN | 107423974 | 12/2017 |
| CN | 107480965 | 12/2017 |
| CN | 207148815 | 3/2018 |
| JP | 6127179 | 5/2017 |
| TW | 201344603 | 11/2013 |
| TW | 201516911 | 5/2015 |
| TW | 201525896 | 7/2017 |
| WO | 2015062255 | 5/2015 |
| WO | WO 2017075238 | 5/2017 |

OTHER PUBLICATIONS

D. Namiot and M. Sneps-Sneppe, "Local messages for smartphones," 2013 Conference on Future Internet Communications (CFIC), 2013, pp. 1-6, doi: 10.1109/CFIC.2013.6566322. (Year: 2013).*

D. Namiot and M. Sneps-Sneppe, "Proximity as a service," 2012 2nd Baltic Congress on Future Internet Communications, 2012, pp. 199-205, doi: 10.1109/BCFIC.2012.6217947. (Year: 2012).*

S. O. Hwang, "Content and Service Protection for IPTV," in IEEE Transactions on Broadcasting, vol. 55, No. 2, pp. 425-436, Jun. 2009, doi: 10.1109/TBC.2009.2020446. (Year: 2009).*

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

PCT International Search Report and Written Opinion in International Application No. PCT/CN2018/099555, dated Sep. 20, 2018, 9 pages (with partial English translation).

PCT International Search Report and Written Opinion in International Application No. PCT/CN2018/099558, dated Nov. 14, 2018, 9 pages (with partial English Translation).

PCT International Search Report and Written Opinion in International Application No. PCT/CN2018/103731, dated Nov. 23, 2018; 10 pages.

U.S. Appl. No. 16/697,882, filed Nov. 27, 2019, Bian et al.

U.S. Appl. No. 16/598,686, filed Oct. 10, 2019, Wang et al.

PCT International Preliminary Report in International Application No. PCT/CN2018/103731, dated Mar. 10, 2020, 12 pages (with English translation).

PCT International Preliminary Reporton Patentability in International Application No. PCT/CN2018099555, dated Feb. 18, 2020, 10 pages (with partial English Translation).

PCT International Preliminary Reporton Patentability in International Application No. PCT/CN2018099558, dated Feb. 18, 2020, 9 pages (with partial English Translation).

Extended European Search Report in European Application No. 18845524.0, dated Mar. 31, 2020, 8 pages.

* cited by examiner

OFFLINE INFORMATION PUSHING METHOD AND APPARATUS

CROSS-REFERENCE TO RELATED APPLICATIONS

This application is a continuation of PCT Application No. PCT/CN2018/103731, filed on Sep. 3, 2018, which claims priority to Chinese Patent Application No. 201710800649.5, filed on Sep. 7, 2017, and each application is hereby incorporated by reference in its entirety.

TECHNICAL FIELD

The specification relates to the field of Internet technologies, and in particular, to an offline information pushing method and apparatus.

BACKGROUND

With the rapid development of Internet technologies, electronic transactions have entered people's lives. Online electronic transactions such as online transfer and online payment are gradually extended to offline scenarios. For example, after purchasing goods or services from entity merchants, users pay bills through the Internet. In offline electronic transaction scenarios, how to improve electronic payment efficiency by using a technical means has become an urgent problem to be resolved.

SUMMARY

In view of this, the specification provides an offline information pushing method and apparatus.

The specification is implemented by using the following technical solutions.

An offline information pushing method includes: probing, by a broadcast device, terminal identifier data within a predetermined distance, uploading, by the broadcast device, the probed terminal identifier data to a server, matching, by the server, an information pushing condition based on the terminal identifier data, pushing, by the server to the broadcast device, information corresponding to an information pushing condition matching the terminal identifier data, and broadcasting, by the broadcast device, the received corresponding information.

An offline information pushing method includes: receiving terminal identifier data probed by a broadcast device, matching an information pushing condition based on the terminal identifier data, and pushing, to the broadcast device, information corresponding to the information pushing condition matching the terminal identifier data, so the broadcast device broadcasts the received corresponding information.

An offline information pushing apparatus includes: a data receiving unit, configured to receive terminal identifier data probed by a broadcast device, a condition matching unit, configured to match an information pushing condition based on the terminal identifier data, and a first pushing unit, configured to push, to the broadcast device, information corresponding to the information pushing condition matching the terminal identifier data, so the broadcast device broadcasts the received corresponding information.

An offline information pushing apparatus includes: a processor, and a memory, configured to store a machine executable instruction, where by reading and executing the machine executable instruction that is stored in the memory and that is corresponding to an offline information pushing logic, the processor is enabled to: receive terminal identifier data probed by a broadcast device, match an information pushing condition based on the terminal identifier data, and push, to the broadcast device, information corresponding to the information pushing condition matching the terminal identifier data, so the broadcast device broadcasts the received corresponding information.

As can be seen from the previous description, in the specification, when there are a large quantity of users in a merchant store, discount audio can be pushed through a broadcast device to encourage the users to use the payment system. After hearing the discount audio, the users can open payment client in advance to improve payment efficiency.

DESCRIPTION OF IMPLEMENTATIONS

Example implementations are described in detail here, and examples of the example implementations are presented in the accompanying drawings. When the following description relates to the accompanying drawings, unless specified otherwise, same numbers in different accompanying drawings represent same or similar elements. Implementations described in the following do not represent all implementations consistent with the specification. On the contrary, the implementations are only examples of apparatuses and methods that are described in the appended claims in details and consistent with some aspects of the specification.

The terms used in the specification are merely for illustrating specific implementations, and are not intended to limit the specification. The terms "a" and "the" in singular forms used in the specification and the appended claims are also intended to include plural forms, unless specified in the context clearly. It should be further understood that the term "and/or" used in the present specification indicates and includes any or all possible combinations of one or more associated listed items.

It should be understood that although terms "first", "second", "third", etc. can be used in the specification to describe various types of information, the information is not limited to the terms. These terms are only used to differentiate information of a same type. For example, without departing from the scope of the specification, first information can also be referred to as second information, and similarly, the second information can be referred to as the first information. Depending on the context, for example, the word "if" used here can be explained as "while", "when", or "in response to determining".

The specification provides an offline information pushing scheme, which can be implemented cooperatively by a server and a broadcast device. The server has a payment function, and is usually a server or a server cluster deployed by a payment service provider. The broadcast device has an audio or audio-video broadcast function.

Figure 1:
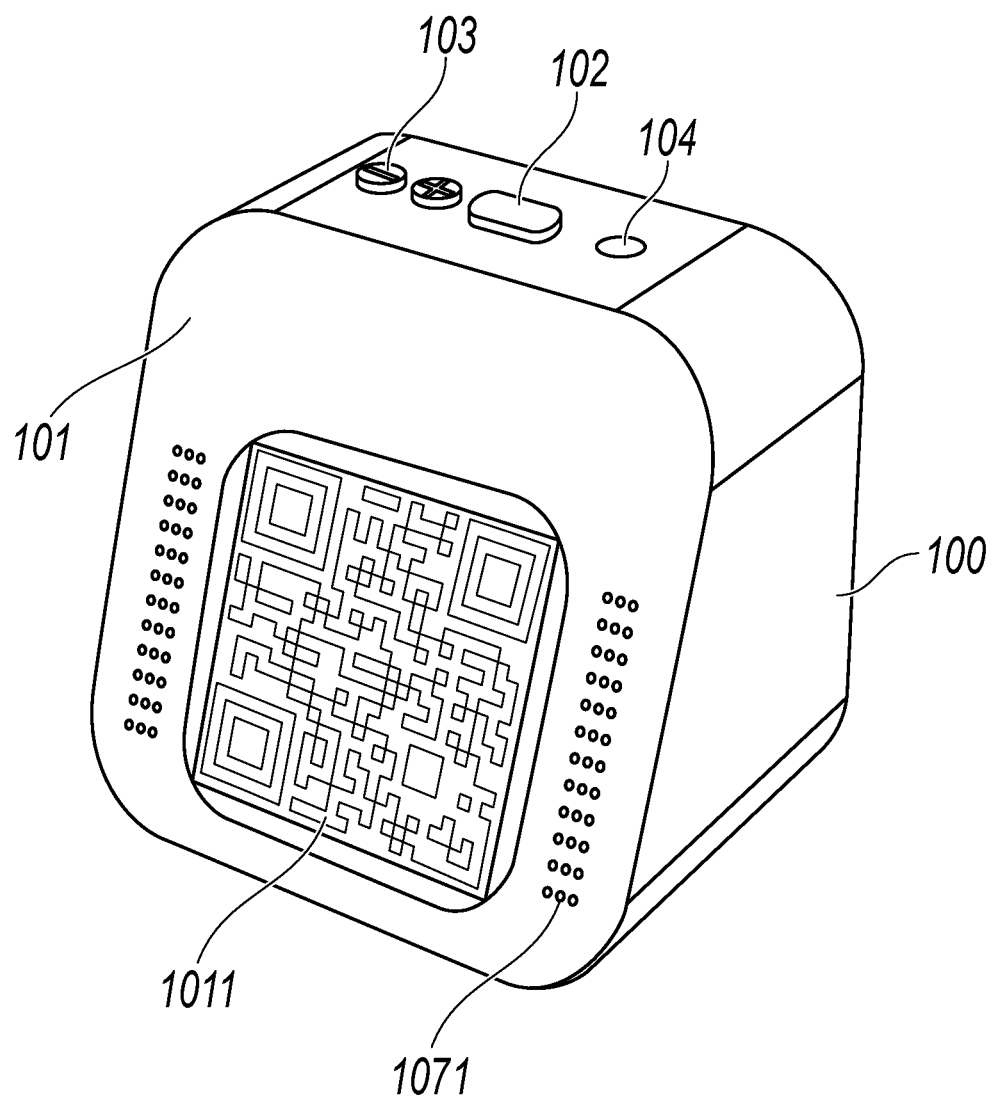
FIG. 1 is a schematic diagram illustrating a broadcast device, according to an example implementation of the specification.

FIG. 1 is a schematic diagram illustrating a broadcast device, according to an example implementation of the specification.

Referring to FIG. 1, the broadcast device includes a device body 100, and the device body 100 includes a first surface 101 that carries a payment graphic code 1011. The payment graphic code 1011 can carry identification information of an account of a service provider. For example, the payment graphic code 1011 can carry an identifier of a merchant account, and a user can scan the payment graphic code 1011 to make payments. The payment graphic code 1011 can alternatively carry a random code. The merchant can bind the payment graphic code 1011 to an account of the merchant. Subsequently, the user scans the payment graphic code 1011 to make payments. Implementations are not limited in the specification.

In an example, a code layer of the payment graphic code 1011 can be bonded to the first surface 101. For example, the merchant prints a payment graphic code that carries account information of the merchant, and then pastes the payment graphic code on the first surface 101.

In another example, the first surface 101 can include a display screen (not shown) configured to display the payment graphic code 1011. For example, after the broadcast device is bound to the merchant account, a server can send related information of the merchant account to the broadcast device, and the broadcast device can further display, on the display screen, the payment graphic code 1011 that carries the merchant account information.

Certainly, in practice, the payment graphic code 1011 can be carried in another way. Implementations are not limited in the specification.

Figure 2:
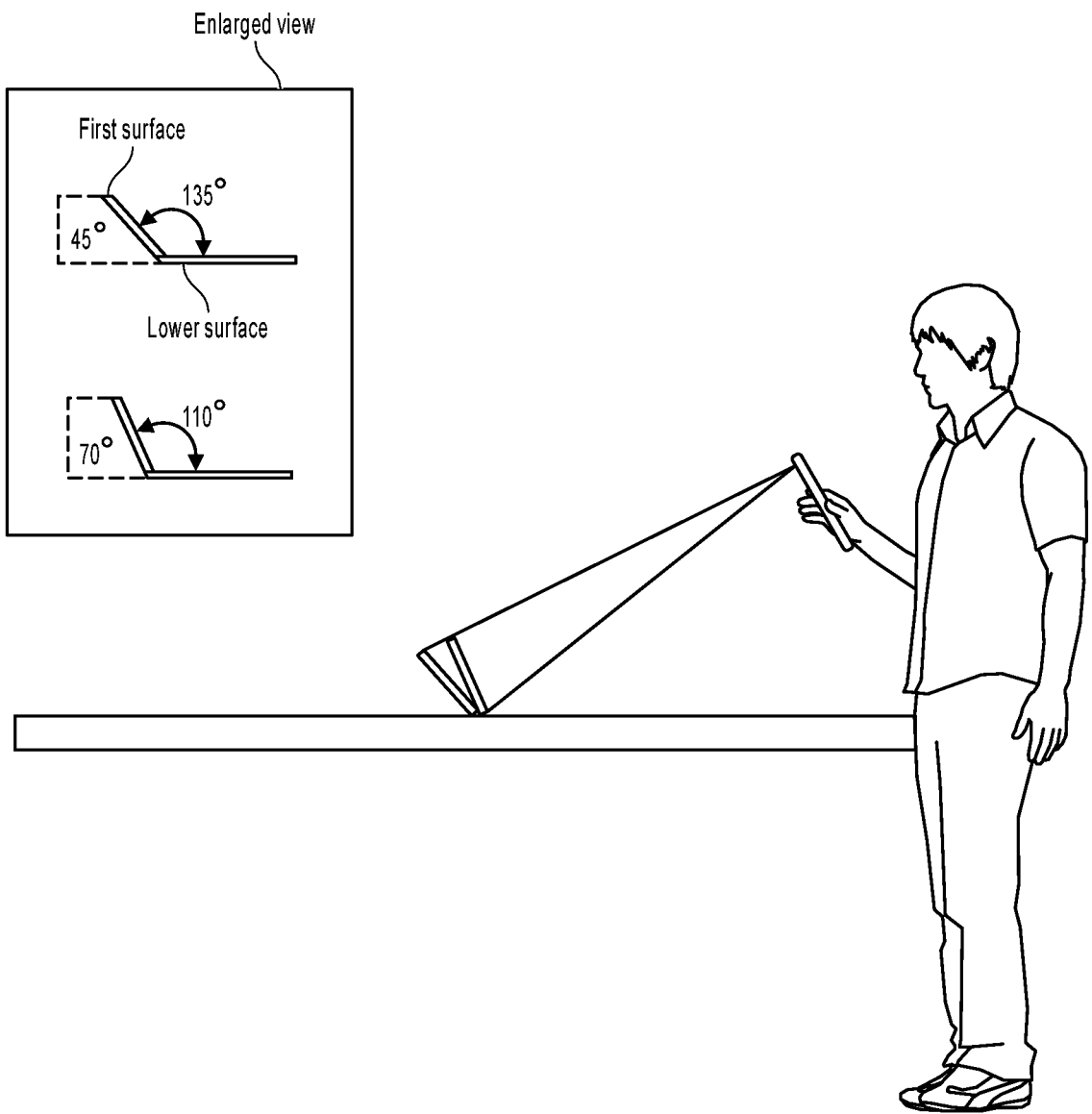
FIG. 2 is a schematic diagram illustrating scanning a payment graphic code on a broadcast device, according to an example implementation of the specification.

In this implementation, to help a user to scan the payment graphic code 1011, an angle between the first surface 101 and the lower surface of the device body can be set to be less than 90 degrees. Referring to FIG. 2, height of a common desktop is generally between 70 cm and 1 m. To adapt to a posture of a user when using a terminal device such as a mobile phone, an angle between the first surface 101 and the lower surface of the device body can be set between 20 degrees and 70 degrees, so the user can scan the payment graphical code 1011, and does not need to often adjust the posture of holding the mobile phone, thereby improving user experience.

Referring back to FIG. 1, a power key (main control key) 102, a volume adjustment button 103, an LED status indicator 104, a USB interface (not shown), a power input line (not shown), etc. can be further disposed on the device body 100 of the broadcast device. There are usually two volume adjustment buttons 103, one is configured to turn up the volume and the other is configured to turn down the volume. The USB interface can be located on a second surface (not shown) on the device body 100 that is opposite to the first surface 101, and can be configured to output power source, to charge a terminal device such as a mobile phone. For example, the USB interface outputs power source of 5V/1 A. The power input line can be used to accept a 220V alternating current etc.

The power key 102, the volume adjustment buttons 103, and the LED status indicator 104 can alternatively be disposed in another positions on the device body 100. Implementations are not limited in the specification.

Figure 3:
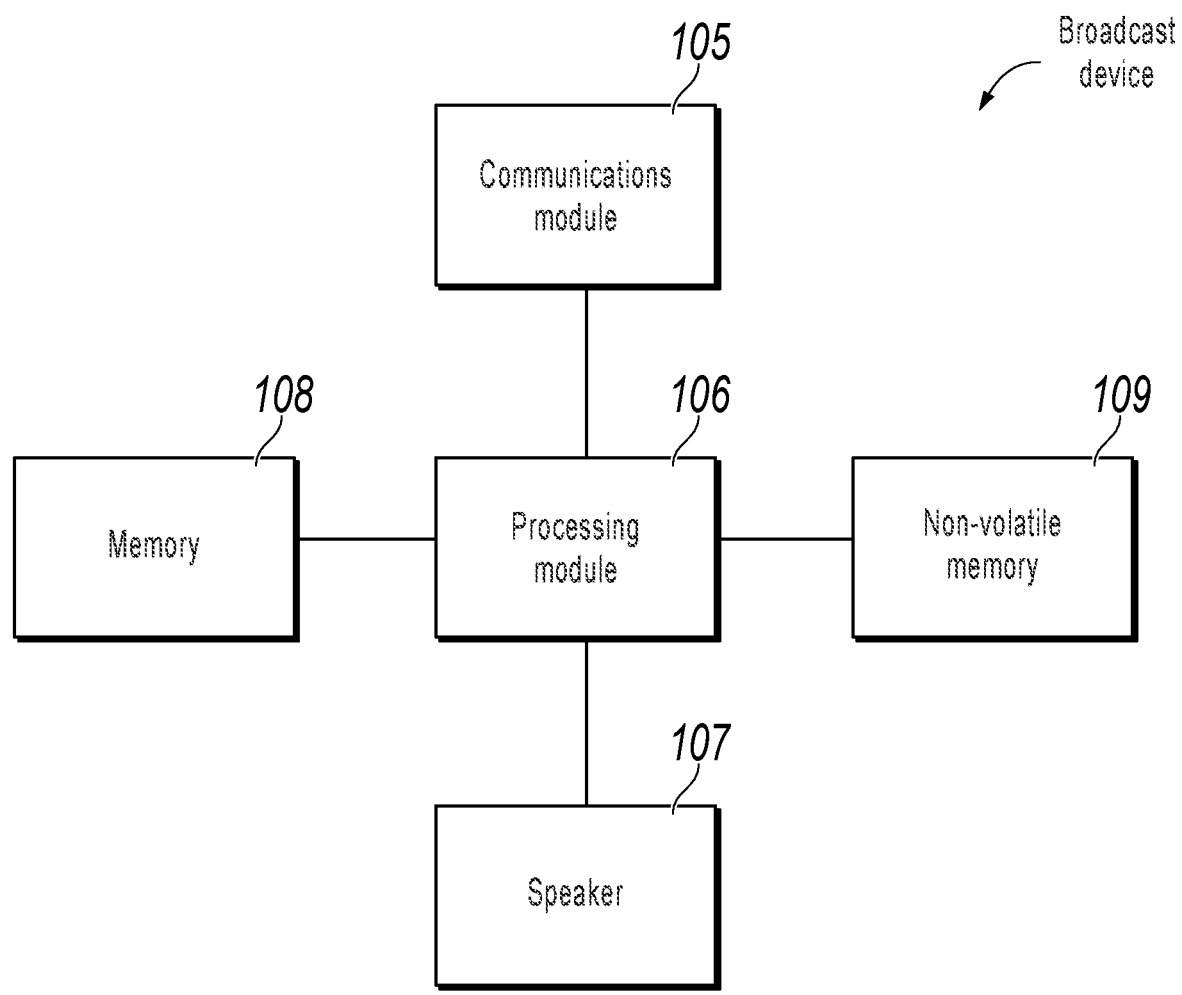
FIG. 3 is a schematic diagram illustrating another broadcast device, according to an example implementation of the specification.

FIG. 3 is a schematic diagram illustrating another broadcast device, according to an example implementation of the specification.

Based on the implementation shown in FIG. 1, referring to FIG. 3, the broadcast device can further include a communications module 105, which is disposed inside the device body 100 and can communicate with the outside by using a wireless and/or wired link. For example, the communications module 105 can be a Wi-Fi module, and can communicate with the outside by using a Wi-Fi technology. For another example, the communications module 105 can be a Bluetooth module, and can communicate with the outside by using a Bluetooth technology. Certainly, the communications module 105 can also be used as a general name of modules that have a communications function, such as a Wi-Fi module and a Bluetooth module. Implementations are not limited in the specification.

The broadcast device further includes a processing module 106, and the processing module 106 is disposed inside the device body 100, and can be electrically connected to the communications module 105. The processing module 106 can be an MCU (Microcontroller Unit), a CPU, an FPGA (Field-Programmable Gate Array), etc. Implementations are not limited in the specification.

The broadcast device can further include a speaker 107, which can be disposed inside the device body 100 and can be electrically connected to the processing module 106. In an example, referring back to FIG. 1, speaker holes 1071 of the speaker 107 can be distributed on both left and right sides of the payment graphic code 1011 on the first surface 101. Certainly, the speaker holes 1071 of the speaker 107 can be distributed at other locations of the device body 100. Implementations are not limited in the specification.

The broadcast device can further include a memory 108, a non-volatile memory 109, etc. The specification sets no special limitation thereto.

In this implementation, for example, a service provider is a merchant, and the merchant can bind a broadcast device to a collection account of the merchant. For example, a device graphic code of the broadcast device can be scanned by a client that is logged in by using the collection account, and then the client can parse out a unique hardware identification code of the device from the device graphic code. Then, the client sends a binding request that carries the hardware identification code and the collection account to the server, so the server stores a binding relationship between the hardware identification code and the collection account.

In this implementation, after processing a payment request for the collection account, the server can send a trigger signal to the broadcast device based on the hardware identification code bound to the collection account. The processing module 106 of the broadcast device can receive the trigger signal from the server by using the communications module 105, and can further output a payment result audio signal to the speaker 107, to drive the speaker 107 to output the payment result audio, for example, successfully received **yuan.

It can be seen from the previous description that, the broadcast device described in the specification integrates the payment graphic code and a payment result broadcasting function, and the user can scan the payment graphic code carried on the device body to make payments. After payments are made, the processing module of the broadcast device can receive the trigger signal from the server by using the communications module, and output the payment result audio signal to the speaker, to drive the speaker to output the payment result audio, thereby reliably broadcasting the payment result in time and improving electronic payment experience. In addition, the brand effect of the server can be improved, which helps promote and popularize the payment platform of the server.

The following uses an example in which the service provider is a merchant to describe a specific implementation process of the specification from four aspects: network configuration of the broadcast device, binding of the broadcast device, powering-on of the broadcast device, and output of the payment result audio.

1. Network configuration of the broadcast device

In this implementation, before the merchant uses the broadcast device, a network of the broadcast device usually needs to be configured to connect the broadcast device to the Internet.

In this implementation, the communications module 105 of the broadcast device includes a Wi-Fi module, and the Wi-Fi module supports a STA (Station) mode+ an AP (Access Point) mode.

After the broadcast device is connected to a power supply, the merchant can switch the Wi-Fi module to the AP mode by using a specified physical key. In the AP mode, the broadcast device serves as an access point, allowing a terminal device to connect to the broadcast device. The specified physical key can be set by a developer. To avoid accidental touching, two physical keys can be set, for example, the power key+ a volume (−) key.

A mobile phone is used as an example. The merchant can simultaneously press the power key and the volume (−) key to switch the Wi-Fi module to the AP mode, and then can select an SSID (Service Set Identifier) of the broadcast device from a Wi-Fi list of the mobile phone, and enter a corresponding password for connection. The SSID and the corresponding password of the broadcast device can be pre-printed on the device body 100, for example, pre-printed on the lower surface of the device body 100.

After successfully connecting the mobile phone to the Wi-Fi of the broadcast device, the merchant can configure Wi-Fi connection information by using the Wi-Fi connection, for example, an SSID and a password of a router. For example, after the Wi-Fi of the broadcast device is successfully connected, the client can display a message indicating that the broadcast device has been connected, and the merchant can further configure the SSID and the password of the router for the broadcast device by using the client.

After receiving the SSID and the password configured by the client, the broadcast device can switch the Wi-Fi module to the STA mode, and then access the corresponding Wi-Fi network based on the configured SSID and password to access the Internet.

After accessing the Internet, the broadcast device can establish a long connection to the server based on a preconfigured address of the server to receive various information sent by the server.

The address of the server is usually stored in a non-volatile memory 109. A packet request for establishing the long connection is usually encapsulated by the processing module 106, and is sent or received by the communications module 105.

In the following description of various functions of the broadcast device, an implementation process of each function is described. For a process in which hardware modules in the broadcast device cooperate to implement corresponding functions, refer to a related technology. Details are omitted subsequently in the specification. For example, the processing module 106 outputs an audio signal to the speaker, to drive the speaker to output the corresponding audio, which can be described as: the broadcast device outputs the corresponding audio etc.

In another example, when the network of the broadcast device is configured, a Bluetooth connection can be first established with the broadcast device, and then Wi-Fi connection information is sent by using the Bluetooth connection, so the broadcast device joins the Internet. The specification sets no special limitation thereto.

2. Binding of the broadcast device

In this implementation, the device body 100 of the broadcast device can also carry a device graphic code (not shown). The device graphic code carries a device identifier of the device, such as a unique hardware identification code.

Because the device graphic code is used only when the merchant is bound to the broadcast device, the device graphic code can be provided on the lower surface of the device body 100. For example, the device graphic code is pasted on the lower surface of the device body. Certainly, the device graphic code can also be provided at another location of the device body, for example, a surface opposite to the first surface 101. The device graphic code can be a bar code, a two-dimensional code, etc. Implementations are not limited in the specification.

Before using the broadcast device, the merchant needs to bind the broadcast device to the collection account (hereinafter referred to as the merchant account) of the merchant.

Figure 4:
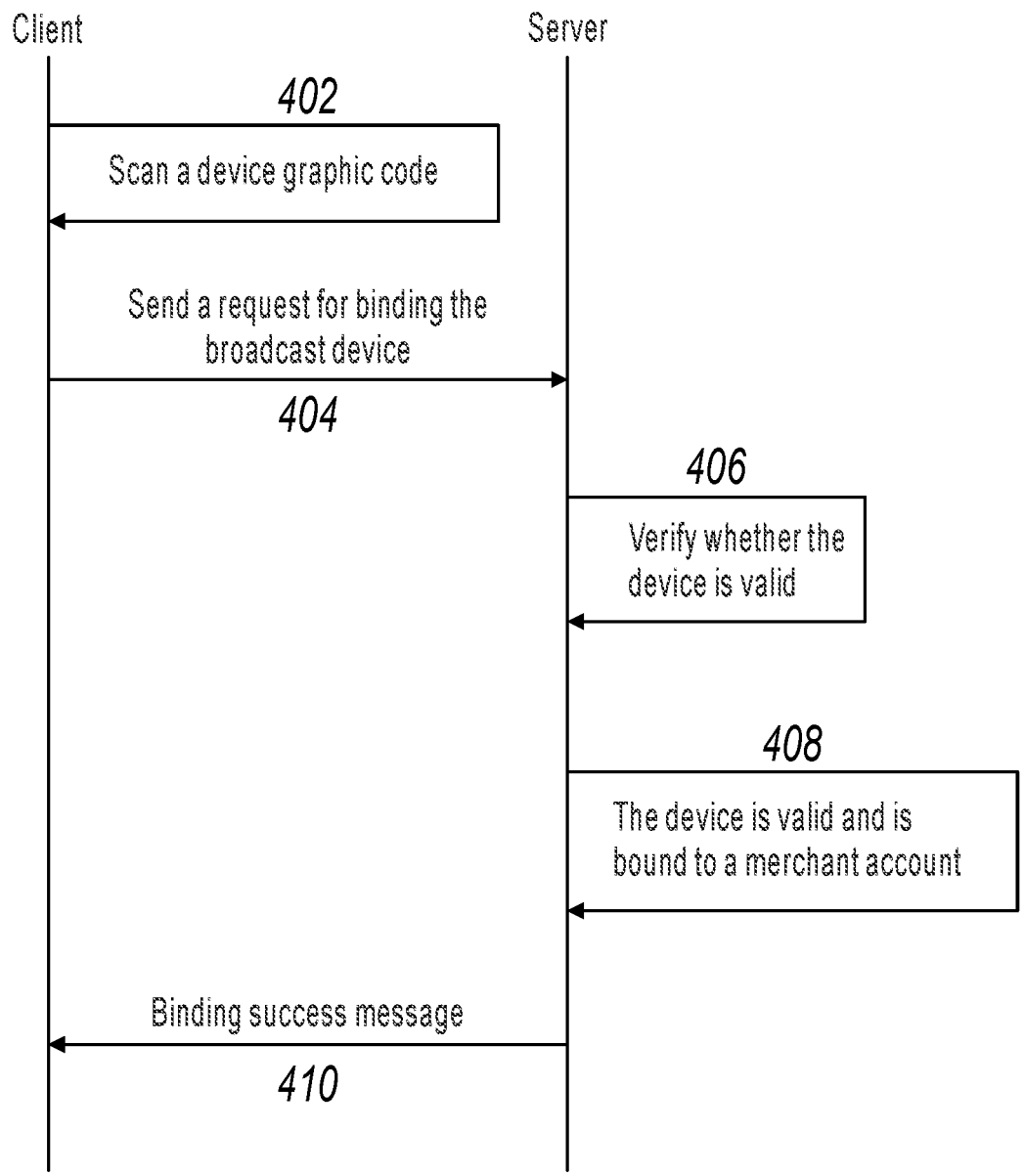
FIG. 4 is a schematic flowchart illustrating binding a broadcast device, according to an example implementation of the specification.

In this implementation, referring to FIG. 4, a process of binding the broadcast device can include the following steps:

Step 402: The client scans the device graphic code of the broadcast device.

The merchant can use a client that is logged in based on the merchant account to scan the device graphic code of the broadcast device.

Step 404: The client sends a request for binding the broadcast device to the server.

After scanning, the client can obtain the device identifier of the broadcast device, and then the client can send the request for binding the broadcast device to the server. The request carries the device identifier and the merchant account, such as identification information of the merchant account.

Step 406: The server verifies whether the broadcast device is a valid device.

After receiving the request for binding the broadcast device, the server can first verify, based on the device identifier, whether the corresponding broadcast device is a valid device.

For example, the server can check whether the broadcast device is valid on a hardware platform that stores identifiers of valid devices.

Certainly, if the server locally stores an identifier list of valid devices, the broadcast device can also be locally verified. Implementations are not limited in this implementation.

If it is determined that the broadcast device is an invalid device, a security prompt can be returned to the client, to prompt the vendor that there is a security risk.

Step 408: If the server determines that the broadcast device is a valid device, the device identifier can be bound to the merchant account.

Step 410: The server returns a binding success message to the client.

In this implementation, after binding the device identifier to the merchant account, the server can further detect whether the corresponding broadcast device is online, that is, detect whether the corresponding broadcast device has established a long connection to the server. If it is determined that the broadcast device is online, a binding success message can be further sent to the broadcast device, and the broadcast device can further output audio that the user account is bound successfully.

The audio that the user account is bound successfully can be general audio, for example, an account is successfully bound. The audio that the user account is bound successfully can further include information about the merchant account, for example, Peter's account is successfully bound. The information about the merchant account is carried in the binding success message sent by the server. Implementations are not limited in this implementation.

In this implementation, the merchant can view a situation of the broadcast device by using the client, for example, whether the broadcast device is bound, and whether the bound broadcast device is online. For processing and implementation of this part, refer to a related technology. Details are omitted here in this implementation.

In this implementation, the merchant can further unbind the broadcast device by using the client, for example, by clicking an unbind button provided on a client user page. The client can further send an unbinding request to the server, and the server can further unbind the binding relationship between the merchant account and the broadcast device. After unbinding, the server can further send the unbinding message to the corresponding broadcast device, so the broadcast device outputs unbinding prompt audio, such as has been unbounded.

Optionally, in another example, the server can further monitor whether a security risk exists on the broadcast device, and when determining that a security risk exists, automatically unbind a binding relationship between the broadcast device and the merchant account, and send a reminder to the client, to ensure that the merchant's interest is not infringed.

In this example, the broadcast device can periodically report device data of the device to the server, and the device data can include an operating system version number, a speaker firmware number, etc. After receiving the device data, the server can determine, based on the device data, whether there is a security risk on the broadcast device. For example, the server can determine whether the operating system version number is the latest version number, determine whether the speaker firmware number is correct, etc. If it is determined that the operating system version number is the latest version number, and the speaker firmware number is correct, it can be determined that the corresponding broadcast device does not have a security risk. If it is determined that the operating system version number is not the latest version number or the speaker firmware number is incorrect, it can be determined that the corresponding broadcast device has a security risk. Certainly, in practice, the device data can further include other information, and the server can determine whether a security risk exists on the broadcast device in another way based on the other information. Implementations are not limited in this implementation.

In this example, the server can determine whether a security risk exists after receiving the device data. The server can also first store the received device data, and subsequently determine security risks offline when the service is not busy. Implementations are not limited in this implementation.

3. Powering-on of the broadcast device

Figure 5:
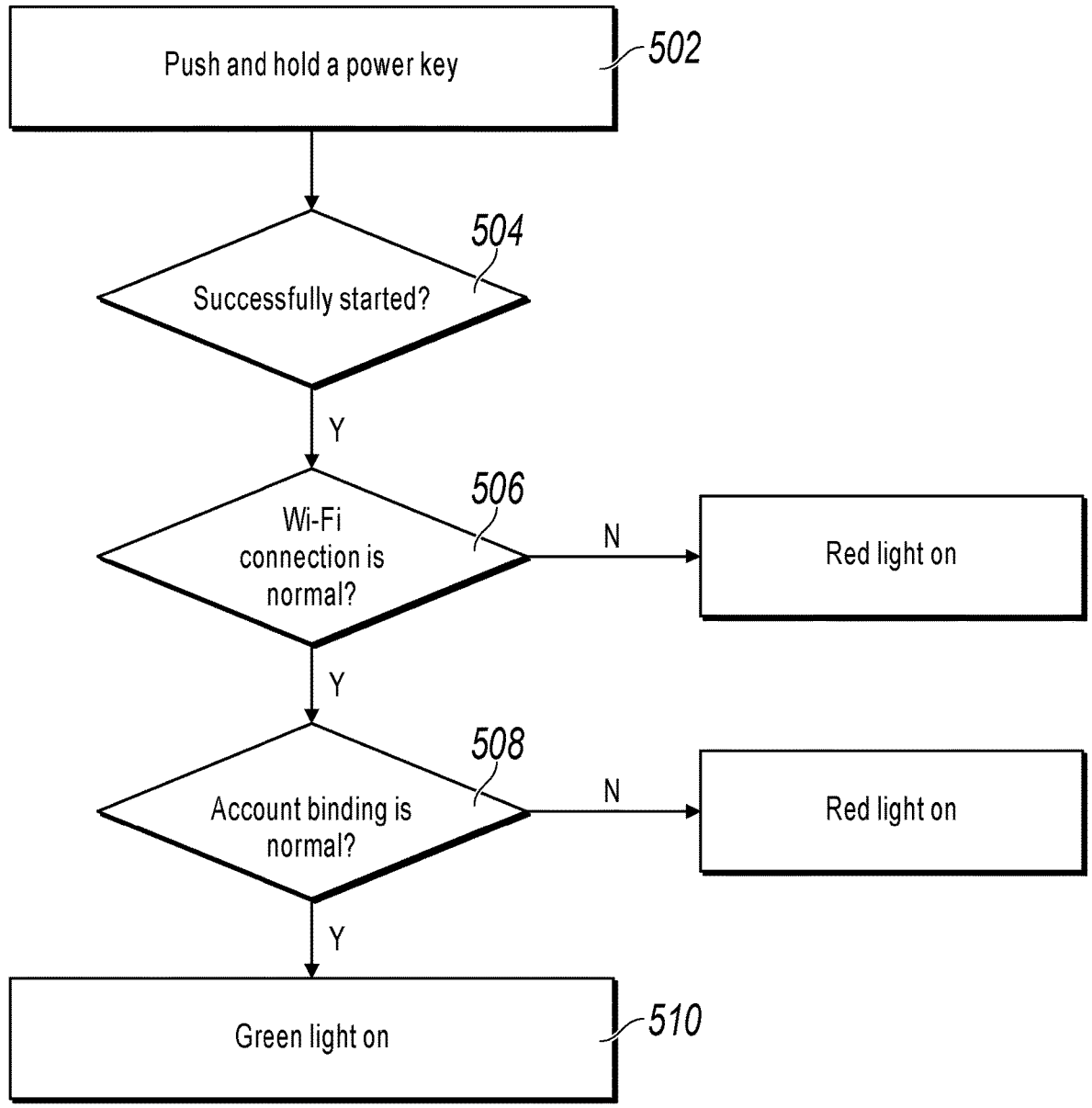
FIG. 5 is a schematic diagram illustrating a powering-on process of a broadcast device, according to an example implementation of the specification.

Referring to FIG. 5, the powering-on process of the broadcast device in this implementation can include the following steps:

Step 502: Push and hold the power key.

In this implementation, to power on the broadcast device, push and hold the power key 102, for example, hold it for 3 seconds.

Step 504: The broadcast device determines whether the device is successfully started, and if the device is successfully started, performs step 506.

In this implementation, if startup fails, a power-on failure sound effect can be output.

Step 506: The broadcast device detects whether a Wi-Fi connection is normal, and if the Wi-Fi connection is normal, performs step 508.

In this implementation, when starting for the first time, because Wi-Fi connection information is not configured, the LED status indicator outputs red light.

In this implementation, after the Wi-Fi connection information is configured, if the broadcast device is successfully started, the broadcast device can attempt to access the network based on the previously configured Wi-Fi connection information, for example, attempt to access the router based on the SSID and the password of the router.

If the network is successfully accessed, it can be determined that the Wi-Fi connection is normal, and further step 508 is performed.

If the network is not accessed successfully, the LED status indicator outputs red light to indicate the network access failure.

Step 508: The broadcast device detects whether the account binding is normal, and if the account binding is normal, performs step 510.

Based on step 506, if the Wi-Fi connection is normal, the broadcast device can establish a long connection to the server based on the saved address of the server, and after the long connection is established, can send a binding query request to the server, to query a binding status between the broadcast device and the merchant account. The binding query request can carry the device identifier of the broadcast device.

After receiving the binding query request, the server can search whether the broadcast device is bound to a merchant account, and return a query result to the broadcast device. The query result can include: bound, not bound.

If a "bound" query result is received, it can be determined that the account binding is normal, and then step 510 is performed.

If a "not bound" query result is received, it can be determined that the account binding is abnormal, and the LED status indicator outputs red for prompting. When determining that the account binding is abnormal based on the LED status indicator, the staff of the store can notify the store owner. The owner can view the binding abnormality through the client to resolve the binding abnormality problem in time and avoid a failure to announce the payment result audio due to the binding abnormality.

Step 510: Control the LED status indicator to output green light.

Based on the detection result in the step 508, if the account binding is normal, it can indicate that the intelligent broadcast device has entered a working state, so green light can be output.

It is worthwhile to note that, in this implementation, a light prompt output by the LED status indicator is only an example. In practice, another light prompt can be output, for example, when the Wi-Fi connection is abnormal, red light can be output. When the account binding is abnormal, red light is output. The specification imposes no special limitation thereto.

4. Output of the payment result audio

Figure 6:
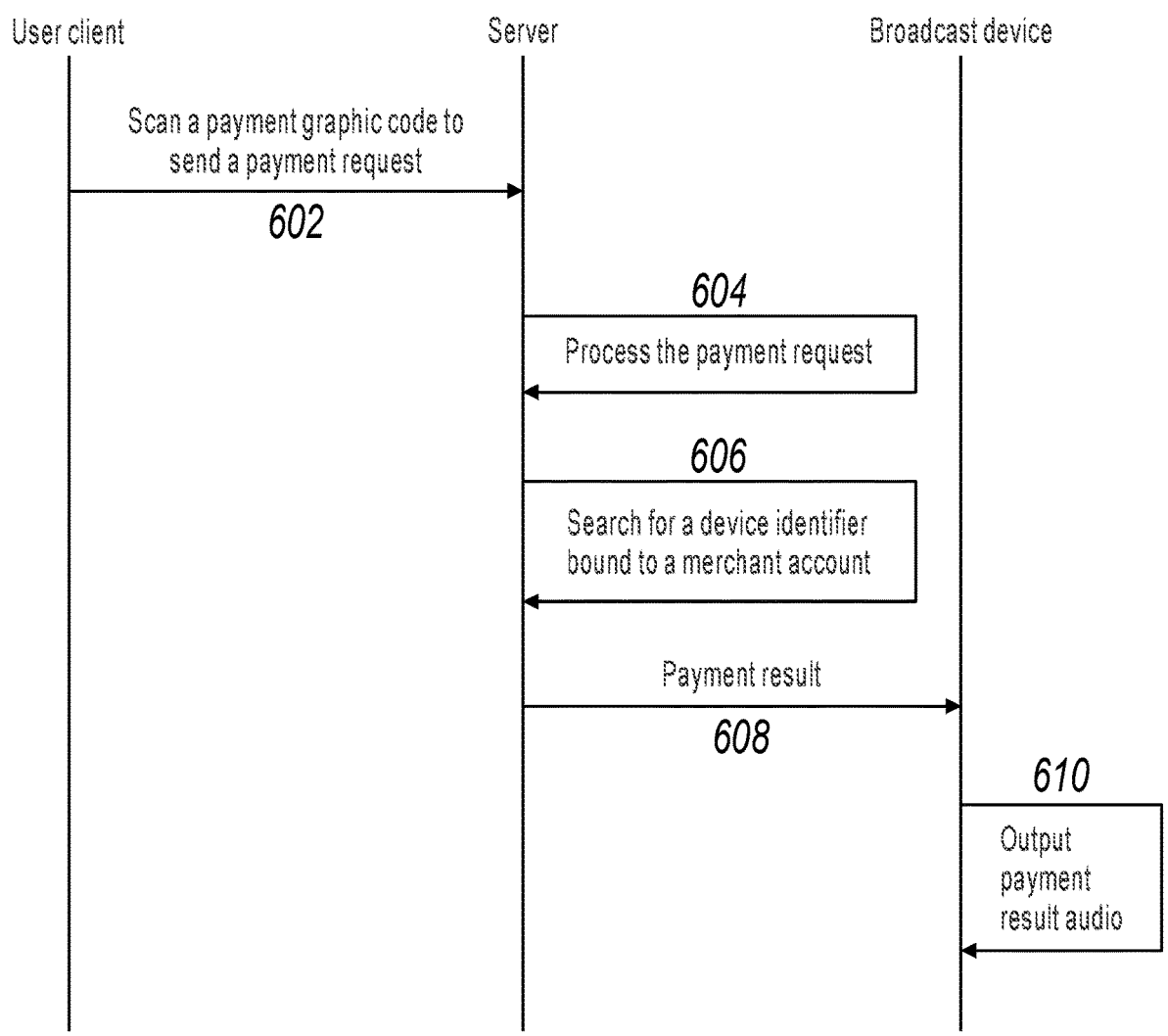
FIG. 6 is a schematic flowchart illustrating broadcasting payment result audio by a broadcast device, according to an example implementation of the specification.

Referring to FIG. 6, broadcasting the payment result audio by the broadcast device can include the following steps:

Step 602: A user scans the payment graphic code carried on the device body of the broadcast device.

In this implementation, after the user performs consumption, the user can scan the payment graphic code carried on the device body of the broadcast device, for example, a payment two-dimensional code, by using the client installed on the mobile phone.

After scanning the payment graphic code, the client can display a payment page oriented to the merchant account, and the user makes payments based on the payment page, for example, enters a consumption amount and confirms payments.

After the user confirms payments, the client can send a payment request to the server, and the payment request usually carries information such as the payment amount, the merchant account, and time.

Optionally, in another example, an NFC (Near Field Communication) module can further be disposed on the broadcast device. When detecting a terminal device supporting the NFC technology, the NFC module can send, to the terminal device by using the NFC technology, the information carried in payment graphic code. After receiving the information, the terminal device can also display the payment page oriented to the merchant account, so the user performs a payment operation. The information carried in the payment graphic code can be sent by the server after the intelligent terminal device binds the merchant account.

In this example, the NFC module sends the information carried in the payment graphic code to effectively prevent a problem that scanning fails due to a misalignment of the payment graphic code when the user scans the payment graphic code, and increase a scanning success rate.

Optionally, in another example, the user can also make payments by scanning a payment two-dimensional code set by the merchant elsewhere. Implementations are not limited in this implementation.

Step 604: The server processes a payment request oriented to the merchant account.

Step 606: After the server successfully makes payments, the server searches for a device identifier of a broadcast device bound to the merchant account.

Step 608: The server sends a payment result to a corresponding broadcast device based on the found device identifier.

Step 610: The broadcast device outputs payment result audio.

In an example, the payment result sent by the server can be payment result audio, and the broadcast device can directly play the audio after receiving the payment result audio.

In another example, because the data amount of the payment result audio is usually large, transmission of the payment result audio can occupy a relatively large bandwidth of the server, which affects performance of the server. Optionally, the payment result sent by the server can be a URL (Uniform Resource Locator) of the payment result audio. After receiving the URL sent by the server, the broadcast device can obtain the corresponding payment result audio from a corresponding address based on the URL, and play the corresponding payment result audio. Compared with the way of directly sending the payment result audio, performance of the server can be improved.

In another example, to reduce occupation of network resources and improve payment result transmission efficiency, the broadcast device can broadcast the payment result audio in an audio assembly way.

In detail, the broadcast device can pre-store basic audio in the payment result audio, for example, "successfully received" and "yuan". After payments are successfully made, the payment result sent by the server to the broadcast device can be a payment result parameter, for example, a specific amount paid by the user.

After receiving the payment result parameter, the broadcast device can assemble the payment result parameter and the saved basic audio to obtain the payment result audio for broadcasting.

For example, the user successfully pays 10 yuan, and the server can send a payment result parameter 10. After receiving the payment result parameter 10, the broadcast device can obtain the basic audio "successfully received" and "yuan", and then assemble the basic audio to obtain the payment result audio "successfully received 10 yuan" for broadcasting.

In another example, when payment fails, the server can also send a payment result to a corresponding broadcast device, so the broadcast device outputs corresponding payment result audio. Implementations are not limited in this implementation.

It can be seen that, after the broadcast device provided in the specification is bound to the merchant account, the payment result audio oriented to the merchant account can be broadcasted, so the staff of the store can hear the payment result in time. Compared with a smart sound box, the broadcast device is independent of the terminal. When the terminal device that is logged in based on the merchant account is not in the store, for example, when the owner of the store leaves the store with the mobile phone, the staff of the store can still hear the payment result, thereby ensuring the merchant's interests. In addition, by using the broadcast device provided in the specification, the brand effect of the payment system can be improved, which helps promote and popularize the payment system.

In another example, the specification further supports offline information pushing by using the broadcast device.

Figure 7:
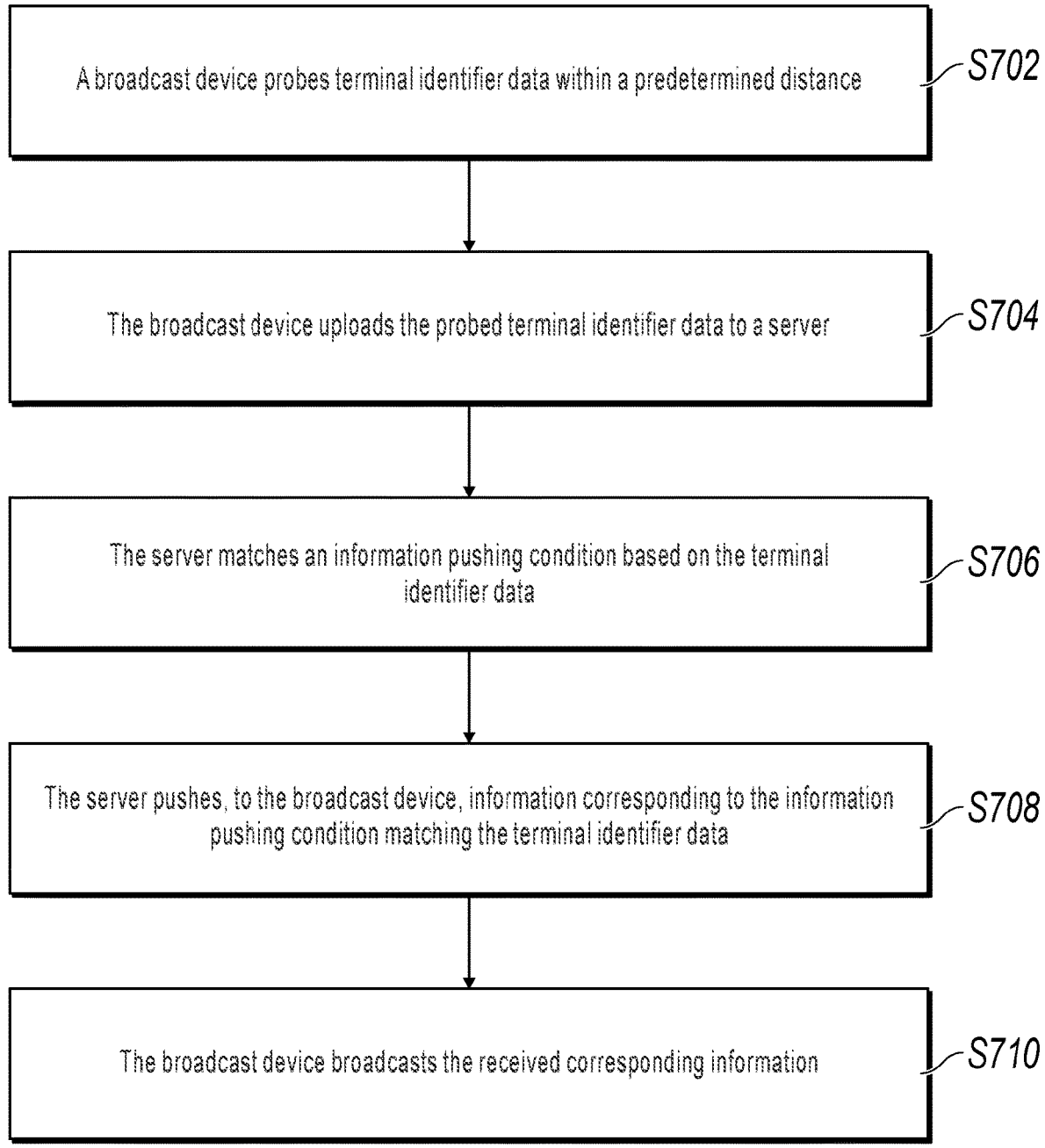
FIG. 7 is a schematic flowchart illustrating an offline information pushing method, according to an example implementation of the specification.

Referring to FIG. 7, the offline information pushing method can include the following steps:

Step 702. A broadcast device probes terminal identifier data within a predetermined distance.

In this implementation, the broadcast device can be further disposed with a Wi-Fi probe module, which can be configured to probe identification data of a terminal device that is within a predetermined distance from the broadcast device. For example, a wireless broadcast signal can be sent to probe a terminal device within coverage of the wireless broadcast information.

On one hand, the terminal identifier data can be used to help a merchant analyze an operation status, for example, customer flow volume, consumers quantity, and lost customers quantity.

On the other hand, the terminal identifier data can be used to help a server push offline information.

The terminal identifier data can be data such as a MAC (Media Access Control) address of the terminal. Implementations are not limited in this implementation.

Step 704. The broadcast device uploads the probed terminal identifier data to a server.

In an example, the broadcast device can upload the probed terminal identifier data to the server based on a predetermined time period.

In another example, the broadcast device can also upload the probed terminal identifier data to the server based on a time point set by the server, for example, report the probed terminal identifier data hourly between 8 a.m. and 6 p.m. everyday.

Step 706. The server matches an information pushing condition based on the terminal identifier data.

Step 708. The server pushes, to the broadcast device, information corresponding to an information pushing condition matching the terminal identifier data.

Step 710. The broadcast device broadcasts the received corresponding information.

In this implementation, the server can determine, based on the terminal identifier data, a quantity of terminals probed by the broadcast device. Based on the quantity of terminals, the server can match the information pushing condition. For example, when the information pushing condition matching the quantity of terminals is that the quantity of terminals is greater than a quantity threshold, information corresponding to the information pushing condition is first-type discount information.

The information pushing condition can be customized by a merchant, or can be customized by the server. Implementations are not limited in this implementation.

Taking customization by the merchant as an example, assume that the merchant customizes that when there are 30 customers in the store, free cola for over 50 yuan purchase. The merchant can predetermine first-type discount information and a pushing condition of the activity by using the client. The pushing condition is that customer quantity in the store reaches 30, and the first-type discount information can be "free cola for over 50 yuan purchase from now on".

Based on the previous configuration, the server can determine, after receiving the terminal identifier data reported by the broadcast device, whether customer quantity in the store reaches 30. If customer quantity in the store reaches 30, the first-type discount information configured by the merchant can be pushed to the broadcast device, for example, a URL of the first-type discount information, so the broadcast device broadcasts the first-type discount information.

The first-type discount information can be audio information, or can be video information. Implementations are not limited in the specification.

For example, the terminal identifier data is a MAC address. Relatively simple, the server can determine a quantity of MAC addresses reported by the broadcast device as the quantity of consumers in the store.

More precisely, the server can set the quantity of MAC addresses as the sum of the quantity of consumers and the quantity of service personnel in the store. The server can also count the quantity of service personnel. For example, MAC addresses reported by the broadcast device in non-business hours are pre-stored as MAC addresses of terminals used by the service personnel. After MAC addresses reported by the broadcast device in business hours are received, the quantity of current service personnel in the store is determined based on the saved MAC addresses of the terminals of the service personnel. Then, a relatively accurate quantity of consumers can be obtained by subtracting the quantity of service personnel from the sum of the previous quantities, and the information pushing condition is matched based on the quantity of consumers.

Taking customization by the server as an example, assume that the server customizes that when the quantity of persons in the store reaches 30, the discount activity of "2 yuan off 10 yuan purchase" is implemented. The server can determine, after receiving the terminal identifier data reported by the broadcast device, whether the customer quantity in the store reaches 30. If customer quantity in the store reaches 30, the first-type discount information of "2 yuan off 10 yuan purchase" can be pushed to the broadcast device for broadcasting.

Optionally, to implement relatively accurate discount pushing, a discount policy of the first-type discount can be related to a category of the merchant.

For example, for merchants with a relatively small average consumption amount such as a convenience store, the first-type discount can be "2 yuan off 10 yuan purchase". For merchants with a relatively large average consumption amount such as Starbucks, the first-type discount can be "10 yuan off 50 yuan purchase".

Certainly, in practice, based on data such as the category of the merchant and the average consumption amount of a consumer, the server can customize the first-type discount accordingly. Implementations are not limited in the specification.

Optionally, after pushing the first-type discount information to the broadcast device, the server can further push the first-type discount information to a user account, i.e., the merchant account, bound to the broadcast device, so the merchant can know about promotion in time.

In this implementation, when the quantity of consumers in the store is relatively large, a discount can be pushed by using the broadcast device, to encourage the consumers to pay by using the payment system. After hearing the discount audio, the consumers can open the payment client in advance, thereby improving payment efficiency.

In another example, the specification can also support pushing of discount in different time periods.

In this example, for ease of distinguishing, a discount corresponding to a time period can be referred to as second-type discount information.

The time period can be divided on a day basis. For example, one day can be divided into three periods: morning, noon, and evening. When the server does not process a payment request oriented to the merchant, for example, there is no consumer paying the merchant, and the broadcast device does not need to broadcast payment result audio, the server can push, to the broadcast device bound to the merchant account, the second-type discount information of a time period different from the current time period, and the broadcast device broadcasts the second-type discount information.

For example, when the server does not process the payment request oriented to the merchant in the morning, the server can push a second-type discount information in the noon or at the evening to the broadcast device bound to the merchant account, for example, push "3 yuan off 30 yuan lunch purchase" to the broadcast device, to increase a repurchase rate at noon or evening for consumers from morning.

Certainly, in practice, the time period is possibly not be divided on a day basis, and can be divided on a week or month basis. Implementations are not limited in this implementation. Optionally, the discount audio can also be pushed in advance for holidays. For example, the discount for the National Day of PRC can be pushed in September by using the broadcast device bound to the merchant account.

In this implementation, by pushing the pay discount audio in different time periods, the repurchase rate of the consumer can be increased, and a consumer loyalty can be improved.

In another example, the specification can also support discount pushing for frequent consumption.

In this example, for ease of distinguishing, discount information for frequent consumption can be referred to as third-type discount information.

The frequent consumption generally refers to consumption in a same merchant for several times within a predetermined time period, consumption by a user in the same merchant for several consecutive days, etc. Corresponding third-type discount information can be pushed to consumers performing frequent consumption, for example, "once consume for 5 consecutive days, you get 5 yuan free of consumption in the 6th day".

In actual implementation, after processing a payment request that has a merchant account as a payee, the server can obtain historical payment data of a current payer, and then determine, based on the historical payment data, whether a predetermined discount condition for frequent customers is satisfied. If the predetermined discount condition for frequent customers is satisfied, the server can push the corresponding third-type discount information to the broadcast device bound to the merchant account.

For example, Marry uses a mobile phone to scan a payment two-dimensional code carried on the broadcast device, and pays a total amount of 20 yuan in the current consumption to the merchant. After processing the payment request, the server can obtain historical payment data of Marry. If it is determined that Marry performs consumption in the merchant every day for three consecutive days (that is, the discount condition for frequent customers is that consumption is performed in the merchant every day for three consecutive days), the server can push, to the broadcast device bound to the merchant account, the discount information "once consume for 5 consecutive days, you get 5 yuan free of consumption in the 6th day", to increase the repurchase rate of Marry in the merchant.

Optionally, the server can further push the historical payment data of Marry to the broadcast device for broadcasting, for example, "you have consumed here for three consecutive days, once consume for 5 consecutive days, you get 5 yuan free of consumption in the 6th day", so the user can know its own consumption status.

In another example, the payer client can further send account information of the payer to the server after the user scans the payment graphic code. The server obtains the historical payment data of the payer based on the account information, and then determines whether the historical payment data matches the discount condition for frequent customers. Optionally, the payer client can further send the account information that is of the payee account and that is carried in the payment graphic code to the server, so the server performs determining. Details are omitted here in this implementation.

In this implementation, the server obtains the historical payment data of the payer, so when the historical payment data matches the predetermined discount condition for frequent customers, the server can send the corresponding discount information to the broadcast device bound to the merchant account, to increase the repurchase rate of the consumer and improve consumer loyalty.

Certainly, in practice, the information pushed by the server to the broadcast device can also be promotional information of various activities such as advertisement and bidding. Implementations are not limited in the specification.

Corresponding to the previous implementation of the offline information pushing method shown in FIG. 7, the specification further provides an implementation of an offline information pushing apparatus.

Figure 8:
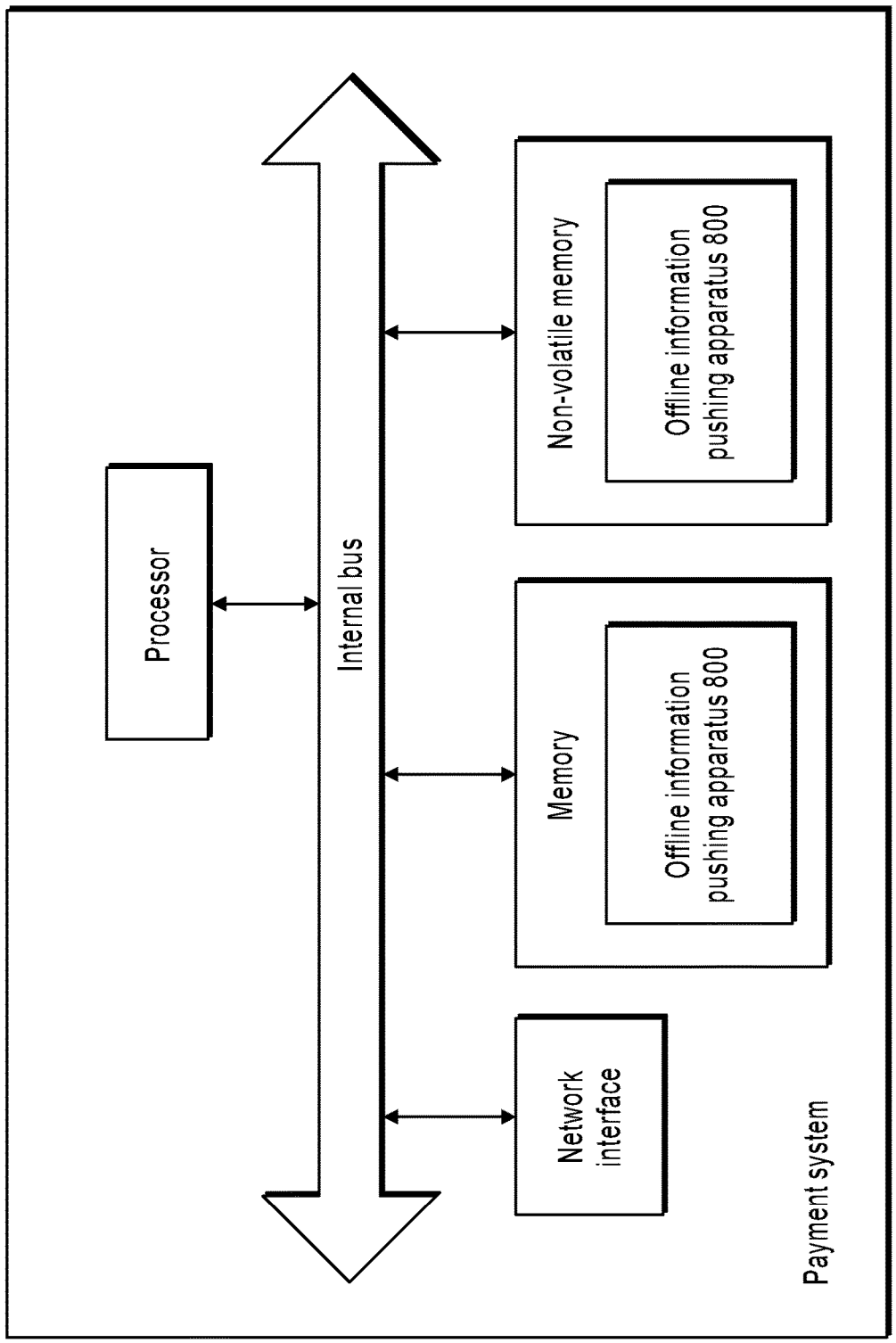
FIG. 8 is a schematic structural diagram illustrating an offline information pushing apparatus, according to an example implementation of the specification.

The implementation of the offline information pushing apparatus in the specification can be applied to the server. The apparatus implementation can be implemented by software, hardware, or a combination of hardware and software. Software implementation is used as an example. As a logical apparatus, the software is formed by reading a corresponding computer program instruction in a non-volatile memory and running the instruction in a memory by a processor in a server of the apparatus. In terms of hardware, FIG. 8 is a structural diagram illustrating hardware of the server that the offline information pushing apparatus of the specification is located. In addition to the processor, the memory, a network interface, and the nonvolatile memory shown in FIG. 8, the server that the apparatus is located in this implementation usually can include other hardware based on an actual function of the server. Details are omitted.

Figure 9:
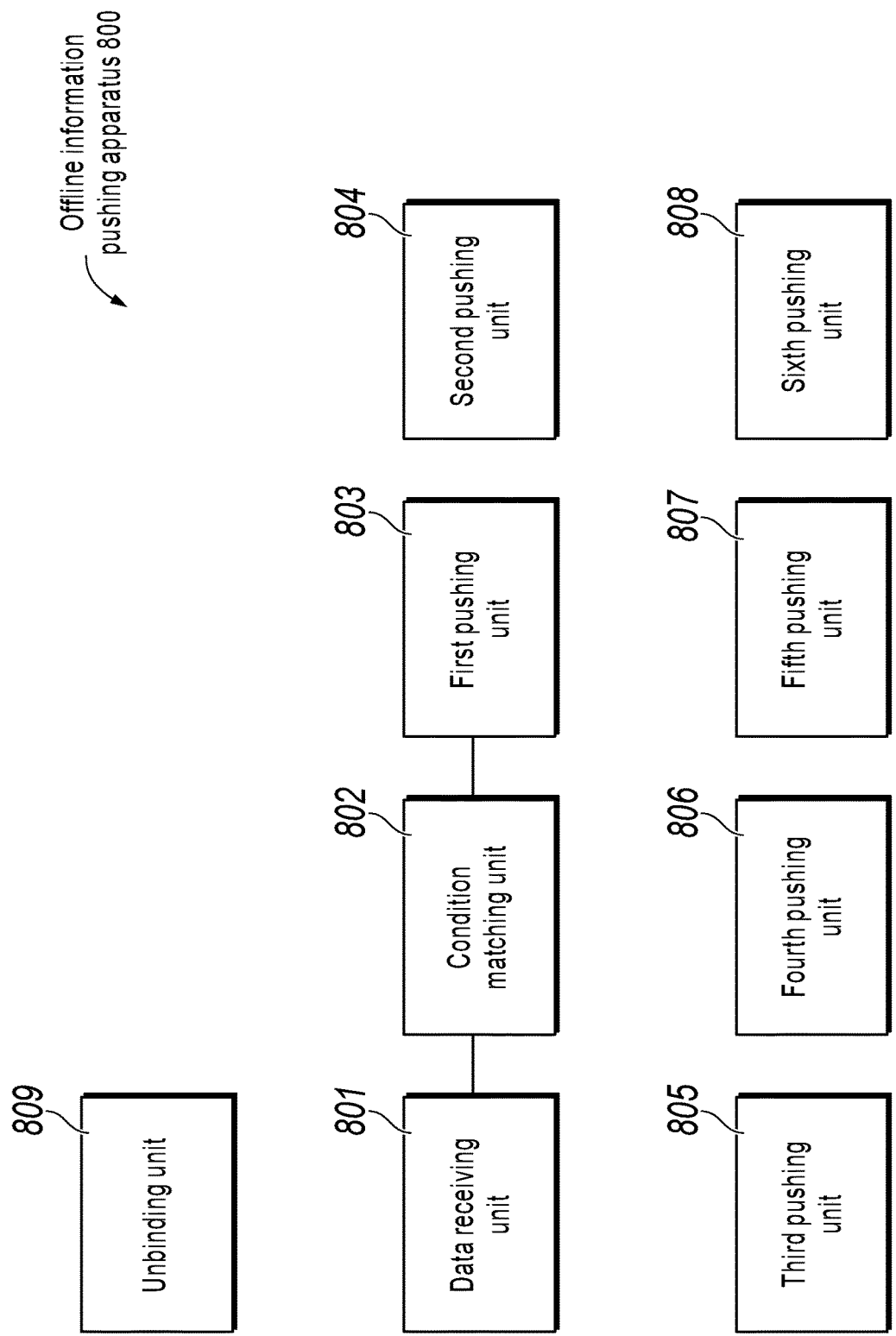
FIG. 9 is a block diagram illustrating an offline information pushing apparatus, according to an example implementation of the specification.

FIG. 9 is a block diagram illustrating an offline information pushing apparatus, according to an example implementation of the specification.

Referring to FIG. 9, the offline information pushing apparatus 800 can be applied to the server shown in FIG. 8, and includes: a data receiving unit 801, a condition matching unit 802, a first pushing unit 803, a second pushing unit 804, a third pushing unit 805, a fourth pushing unit 806, a fifth pushing unit 807, a sixth pushing unit 808, and an unbinding unit 809.

The data receiving unit 801 is configured to receive terminal identifier data probed by a broadcast device, the condition matching unit 802 is configured to match an information pushing condition based on the terminal identifier data, and the first pushing unit 803 is configured to push, to the broadcast device, information corresponding to the information pushing condition matching the terminal identifier data, so the broadcast device broadcasts the received corresponding information.

Optionally, the condition matching unit 802 determines, based on the terminal identifier data, a quantity of terminals probed by the broadcast device, and matches an information pushing condition based on the quantity of terminals.

Optionally, when the information pushing condition matching the quantity of terminals is that the quantity of terminals is greater than a quantity threshold, information corresponding to the information pushing condition is first-type discount information.

Optionally, the broadcast device is bound to a user account, and a discount policy of the first-type discount information is related to a category of an object to which the user account belongs.

Optionally, the broadcast device is bound to a user account, and the second pushing unit 804 is configured to: when the information corresponding to the information pushing condition matching the terminal identifier data is pushed to the broadcast device, further push the corresponding information to the user account bound to the broadcast device.

The third pushing unit 805 is configured to: after a payment request that has a user account bound to the broadcast device as a payee is processed, send a payment result to the broadcast device, so the broadcast device broadcasts the payment result, and the fourth pushing unit 806 is configured to: when the payment request that has the user account bound to the broadcast device as a payee is not processed, push second-type discount information of a time period different from a current time period to the broadcast device, so the broadcast device broadcasts the second-type discount information.

The fifth pushing unit 807 is configured to: after a payment request that has a user account bound to the broadcast device as a payee is processed, obtain historical payment data of a payer of the payment request, determine whether the historical payment data matches a first discount condition for frequent customers, and if matched, push third-type discount information corresponding to the first discount condition for frequent customers to the broadcast device, so the broadcast device broadcasts the third-type discount information.

The sixth pushing unit 808 is configured to receive account information of a payer that is sent by a client of the payer after the client of the payer scans a payment graphic code, obtain historical payment data of the payer based on the account information, determine whether the historical payment data matches a second discount condition for frequent customers, and if matched, push fourth-type discount information corresponding to the second discount condition for frequent customers to the broadcast device, where the broadcast device is bound to a payee account specified by the payment graphic code, so the broadcast device broadcasts the fourth-type discount information.

The unbinding unit 809 is configured to receive device data reported by the broadcast device, determine, based on the device data, whether the broadcast device has a security risk, and when it is determined that the broadcast device has a security risk, unbind a binding relationship between the broadcast device and a user account.

For an implementation process of functions and roles of each unit in the apparatus, references can be made to an implementation process of corresponding steps in the previous method. Details are omitted here.

Because an apparatus implementation basically corresponds to a method implementation, for related parts, references can be made to related descriptions in the method implementation. The previously described apparatus implementation is merely an example. The units described as separate parts can or cannot be physically separate, and parts displayed as units can or cannot be physical units, can be located in one position, or can be distributed on a plurality of network units. Some or all of the modules can be selected based on actual requirements to achieve the objectives of the solutions of the present specification. A person of ordinary skill in the art can understand and implement the implementations of the present application without creative efforts.

The system, apparatus, module, or unit illustrated in the previous implementations can be implemented by using a computer chip or an entity, or can be implemented by using a product having a certain function. A typical implementation device is a computer, and the computer can be a personal computer, a laptop computer, a cellular phone, a camera phone, an intelligent phone, a personal digital assistant, a media player, a navigation device, an email receiving and sending device, a game console, a tablet computer, a wearable device, or any combination of these devices.

Corresponding to the previous implementation of the offline information pushing method shown in FIG. 7, the specification further provides another offline information pushing apparatus, and the apparatus includes a processor and a memory configured to store a machine executable instruction. The processor and the memory are generally connected to each other by using an internal bus. In other possible implementations, the device can further include an external interface capable of communicating with another device or component.

In this implementation, by reading and executing the machine executable instruction that is stored in the memory and that is corresponding to an offline information pushing logic, the processor is enabled to: receive terminal identifier data probed by a broadcast device, match an information pushing condition based on the terminal identifier data, and push information corresponding to the information pushing condition matching the terminal identifier data to the broadcast device, so the broadcast device broadcasts the received corresponding information.

Optionally, when matching the information pushing condition based on the terminal identifier data, the processor is enabled to: determine, based on the terminal identifier data, a quantity of terminals probed by the broadcast device, and match an information pushing condition based on the quantity of terminals.

Optionally, when the information pushing condition matching the quantity of terminals is that the quantity of terminals is greater than a quantity threshold, information corresponding to the information pushing condition is first-type discount information.

Optionally, the broadcast device is bound to a user account, and a discount policy of the first-type discount information is related to a category of an object to which the user account belongs.

Optionally, the broadcast device is bound to a user account, and by reading and executing the machine executable instruction that is stored in the memory and that is corresponding to an offline information pushing logic, the processor is enabled to: when the information corresponding to the information pushing condition matching the terminal identifier data is pushed to the broadcast device, further push the corresponding information to the user account bound to the broadcast device.

Optionally, by reading and executing the machine executable instruction that is stored in the memory and that is corresponding to an offline information pushing logic, the processor is further enabled to: after a payment request that has a user account bound to the broadcast device as a payee is processed, send a payment result to the broadcast device, so the broadcast device broadcasts the payment result, and when the payment request that has the user account bound to the broadcast device as a payee is not processed, push second-type discount information of a time period different from a current time period to the broadcast device, so the broadcast device broadcasts the second-type discount information.

Optionally, by reading and executing the machine executable instruction that is stored in the memory and that is corresponding to an offline information pushing logic, the processor is further enabled to: after a payment request that has a user account bound to the broadcast device as a payee is processed, obtain historical payment data of a payer of the payment request, determine whether the historical payment data matches a first discount condition for frequent customers, and if matched, push third-type discount information corresponding to the first discount condition for frequent customers to the broadcast device, so the broadcast device broadcasts the third-type discount information.

Optionally, by reading and executing the machine executable instruction that is stored in the memory and that is corresponding to an offline information pushing logic, the processor is further enabled to: receive account information of a payer that is sent by a client of the payer after the client of the payer scans a payment graphic code, obtain historical payment data of the payer based on the account information, determine whether the historical payment data matches a second discount condition for frequent customers, and if matched, push fourth-type discount information corresponding to the second discount condition for frequent customers to the broadcast device, where the broadcast device is bound to a payee account specified by the payment graphic code, so the broadcast device broadcasts the fourth-type discount information.

Optionally, by reading and executing the machine executable instruction that is stored in the memory and that is corresponding to an offline information pushing logic, the processor is further enabled to: receive device data reported by the broadcast device, determine, based on the device data, whether the broadcast device has a security risk, and when it is determined that the broadcast device has a security risk, unbind a binding relationship between the broadcast device and a user account.

Corresponding to the previous implementation of the offline information pushing method shown in FIG. 7, the specification further provides a computer readable storage medium, where the computer readable storage medium stores a computer program, and when the program is executed by a processor, the following steps are implemented: receiving terminal identifier data probed by a broadcast device, matching an information pushing condition based on the terminal identifier data, and pushing, to the broadcast device, information corresponding to the information pushing condition matching the terminal identifier data, so the broadcast device broadcasts the received corresponding information.

Optionally, the matching an information pushing condition based on the terminal identifier data includes: determining, based on the terminal identifier data, a quantity of terminals probed by the broadcast device, and matching an information pushing condition based on the quantity of terminals.

Optionally, when the information pushing condition matching the quantity of terminals is that the quantity of terminals is greater than a quantity threshold, information corresponding to the information pushing condition is first-type discount information.

Optionally, the broadcast device is bound to a user account, and a discount policy of the first-type discount information is related to a category of an object to which the user account belongs.

Optionally, the broadcast device is bound to a user account, and the method further includes: when the information corresponding to the information pushing condition matching the terminal identifier data is pushed to the broadcast device, further pushing the corresponding information to the user account bound to the broadcast device.

Optionally, the method further includes: after a payment request that has a user account bound to the broadcast device as a payee is processed, sending a payment result to the broadcast device, so the broadcast device broadcasts the payment result, and when the payment request that has the user account bound to the broadcast device as a payee is not processed, pushing second-type discount information of a time period different from a current time period to the broadcast device, so the broadcast device broadcasts the second-type discount information.

Optionally, the method further includes: after a payment request that has a user account bound to the broadcast device as a payee is processed, obtaining historical payment data of a payer of the payment request, determining whether the historical payment data matches a first discount condition for frequent customers, and if matched, pushing third-type discount information corresponding to the first discount condition for frequent customers to the broadcast device, so the broadcast device broadcasts the third-type discount information.

Optionally, the method further includes: receiving account information of a payer that is sent by a client of the payer after the client of the payer scans a payment graphic code, obtaining historical payment data of the payer based on the account information, determining whether the historical payment data matches a second discount condition for frequent customers, and if matched, pushing fourth-type discount information corresponding to the second discount condition for frequent customers to the broadcast device, where the broadcast device is bound to a payee account specified by the payment graphic code, so the broadcast device broadcasts the fourth-type discount information.

Optionally, the method further includes: receiving device data reported by the broadcast device, determining, based on the device data, whether the broadcast device has a security risk, and when it is determined that the broadcast device has a security risk, unbinding a binding relationship between the broadcast device and a user account.

Specific implementations of the present application are described above. Other implementations fall within the scope of the appended claims. In some situations, the actions or steps described in the claims can be performed in an order different from the order in the implementations and the desired results can still be achieved. In addition, the process depicted in the accompanying drawings does not necessarily require a particular execution order to achieve the desired results. In some implementations, multi-tasking and parallel processing can be advantageous.

The previous descriptions are merely preferred implementations of the present specification, but are not intended to limit the present specification. Any modification, equivalent replacement, or improvement made without departing from the spirit and principle of the present specification shall fall within the protection scope of the present specification.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A method performed by one or more computers, the method comprising:
   broadcasting, by a broadcast device, a wireless broadcast signal;
   receiving, by the broadcast device, probing data from one or more terminal devices that received the wireless broadcast signal, the probing data comprising terminal identifier data that includes one or more MAC addresses of the one or more terminal devices, respectively, wherein the one or more terminal devices is divided into a plurality of categories;
   uploading, by the broadcast device, the probing data to a server;
   receiving, by the broadcast device and from the server, discount information subsequent to the server resolving, based on the one or more MAC addresses, that a quantity of a particular category of the plurality of categories of the one or more terminal devices is greater than a pre-stored number of MAC addresses; and
   broadcasting, by the broadcast device, the discount information.

2. The method according to claim 1, wherein resolving that the quantity of a particular category of the plurality of categories of the one or more terminal devices is greater than the pre-stored number of MAC addresses comprises:
   matching, by the server, an information pushing condition with the quantity of the one or more terminal devices.

3. The method according to claim 2, wherein the information pushing condition includes first-type discount information.

4. The method according to claim 3, wherein:
   the broadcast device is bound to a user account; and
   a discount policy of the first-type discount information is related to a category of an object to which the user account belongs.

5. The method according to claim 1, wherein the broadcast device is bound to a user account, and the method further comprises:
   when receiving, by the broadcast device, the discount information, pushing, by the server, the discount information to the user account bound to the broadcast device.

6. The method according to claim 1, further comprising:
   in response to determining that a payment request is processed, wherein the payment request comprises a user account that is bound to the broadcast device and is a payee, sending, by the server, a payment result to the broadcast device;
   broadcasting, by the broadcast device, the payment result;
   in response to determining that the payment request is not processed, wherein the payment request comprises the user account that is bound to the broadcast device and is the payee, pushing, by the server, second-type discount information of a time period different from a current time period to the broadcast device; and
   broadcasting, by the broadcast device, the second-type discount information.

7. The method according to claim 1, further comprising:
   in response to determining that a payment request is processed, wherein the payment request comprises a user account that is bound to the broadcast device and is a payee, obtaining, by the server, historical payment data of a payer of the payment request;
   determining, by the server, that the historical payment data matches a first discount condition for frequent customers;
   in response, pushing, by the server to the broadcast device, third-type discount information corresponding to the first discount condition for frequent customers; and
   broadcasting, by the broadcast device, the third-type discount information.

8. The method according to claim 1, further comprising:
   receiving, by the server, account information of a payer that is sent by a client of the payer after the client of the payer scans a payment graphic code;
   obtaining, by the server, historical payment data of the payer based on the account information;
   determining, by the server, that the historical payment data matches a second discount condition for frequent customers;
   in response, pushing, by the server, fourth-type discount information corresponding to the second discount condition for frequent customers to a broadcast device, wherein the broadcast device is bound to a payee account specified by the payment graphic code; and
   broadcasting, by the broadcast device, the fourth-type discount information.

9. An information pushing method, comprising:
   receiving probing data from one or more terminal devices that received a wireless broadcast signal, the probing data comprising terminal identifier data that includes one or more MAC addresses of the one or more terminal devices, respectively, wherein the one or more terminal devices is divided into a plurality of categories;
   determining a quantity of a particular category of the plurality of categories of the one or more terminal devices is greater than a pre-stored number of MAC addresses based on a quantity of the one or more MAC addresses of the one or more terminal devices; and
   pushing, to a broadcast device, discount information, so the broadcast device broadcasts the discount information.

10. The method according to claim 9, wherein the determining that the quantity of a particular category of the plurality of categories of the one or more terminal devices is greater than the pre-stored number of MAC addresses comprises:
    matching an information pushing condition with the quantity of the one or more terminal devices.

11. The method according to claim 10, wherein the information pushing condition includes first-type discount information.

12. The method according to claim 11, wherein:
    the broadcast device is bound to a user account; and
    a discount policy of the first-type discount information is related to a category of an object to which the user account belongs.

13. The method according to claim 9, wherein the broadcast device is bound to a user account, and the method further comprises:
    pushing the discount information to the user account bound to the broadcast device.

14. The method according to claim 9, further comprising:
    in response to determining that a payment request is processed, wherein the payment request comprises a user account that is bound to the broadcast device and is a payee, sending a payment result to the broadcast device, wherein the broadcast device broadcasts the payment result; and in response to determining that the payment request is not processed, wherein the payment request comprises the user account that is bound to the broadcast device and is the payee, pushing second-type discount information of a time period different from a current time period to the broadcast device, wherein the broadcast device broadcasts the second-type discount information.

15. The method according to claim 9, further comprising:

in response to determining that a payment request is processed, wherein the payment request comprises a user account that is bound to the broadcast device and is a payee, obtaining historical payment data of a payer of the payment request;

determining that the historical payment data matches a first discount condition for frequent customers; and in response, pushing, to the broadcast device, third-type discount information corresponding to the first discount condition for frequent customers, wherein the broadcast device broadcasts the third-type discount information.

16. The method according to claim 9, further comprising:

receiving account information of a payer that is sent by a client of the payer after the client of the payer scans a payment graphic code;

obtaining historical payment data of the payer based on the account information;

determining that the historical payment data matches a second discount condition for frequent customers; and in response, pushing fourth-type discount information corresponding to the second discount condition for frequent customers to a broadcast device, wherein the broadcast device is bound to a payee account specified by the payment graphic code, wherein the broadcast device broadcasts the fourth-type discount information.

17. The method according to claim 9, further comprising:

receiving device data reported by the broadcast device;

determining, based on the device data, whether the broadcast device has a security risk; and in response to determining that the broadcast device has a security risk, unbinding a binding relationship between the broadcast device and a user account.

18. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

receiving probing data from one or more terminal devices that received a wireless broadcast signal, the probing data comprising terminal identifier data that includes one or more MAC addresses of the one or more terminal devices, respectively, wherein the one or more terminal devices is divided into a plurality of categories;

determining a quantity of a particular category of the plurality of categories of the one or more terminal devices is greater than a pre-stored number of MAC addresses based on a quantity of the one or more MAC addresses of the one or more terminal devices; and pushing, to a broadcast device, discount information, so the broadcast device broadcasts the discount information.

19. The computer-implemented system according to claim 18, wherein the operations comprise:

matching an information pushing condition based on the quantity of the one or more terminal devices.

20. The computer-implemented system according to claim 19, wherein the information pushing condition includes first-type discount information.

* * * * *